United States Patent
Cason

(10) Patent No.: US 7,472,081 B1
(45) Date of Patent: Dec. 30, 2008

(54) METHOD FOR SHOPPING USING WIRELESS COMMUNICATION

(75) Inventor: Stanley Philip Cason, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/020,546

(22) Filed: Jan. 27, 2008

(51) Int. Cl.
*G06F 30/00* (2006.01)
(52) U.S. Cl. .................... 705/26; 705/1; 705/27
(58) Field of Classification Search ........... 705/1, 705/26, 27
See application file for complete search history.

(56) References Cited

U.S. PATENT DOCUMENTS

| | | | | |
|---|---|---|---|---|
| 5,978,772 | A * | 11/1999 | Mold | 705/16 |
| 6,134,548 | A * | 10/2000 | Gottsman et al. | 707/5 |
| 6,507,279 | B2 * | 1/2003 | Loof | 340/572.1 |
| 6,873,967 | B1 * | 3/2005 | Kalagnanam et al. | 705/26 |
| 7,178,722 | B2 | 2/2007 | Do et al. | |
| 7,200,566 | B1 | 4/2007 | Moore et al. | |
| 2001/0044784 | A1 * | 11/2001 | Harada | 705/64 |
| 2001/0049636 | A1 | 12/2001 | Hudda et al. | |
| 2002/0082931 | A1 * | 6/2002 | Siegel et al. | 705/26 |
| 2002/0117544 | A1 | 8/2002 | Wolf et al. | |
| 2002/0165803 | A1 * | 11/2002 | Iwase et al. | 705/28 |
| 2004/0181461 | A1 * | 9/2004 | Raiyani et al. | 705/26 |
| 2006/0143091 | A1 | 6/2006 | Yuan et al. | |

OTHER PUBLICATIONS

Cross, Richard and Neal, Mollie, High Tech Shopping Arrives at the Mall, Apr. 2000, Direct Marketing, vol. 62, No. 12, p. 40.*

* cited by examiner

*Primary Examiner*—Jeffrey A. Smith
*Assistant Examiner*—Jason B. Dunham
(74) *Attorney, Agent, or Firm*—Maxvalue IP, LLC

(57) ABSTRACT

This is a system to assist shoppers through a handheld wireless communications device which is Bluetooth-enabled (as an example) (a registered trademark), connected to a barcode reader to scan Universal Product Code (UPC) barcodes on items in the store. The shopper is required to login to the store's shopping system using this device once a personal account has created. While shopping, scan the items, view their prices and running total and finally complete the purchase. This system is also capable of (as an example) consolidating a personal shopping list created remotely through vendor's web site or stored on the personal communication device and the shopping cart to help and enhance the shopping experience.

1 Claim, 5 Drawing Sheets

METHOD FOR SHOPPING USING WIRELESS COMMUNICATION

BACKGROUND OF THE INVENTION

Shoppers frequently are not sure of the price of an item on the shelf. It is not clear exactly which item is being referred to for sale prices, whether it is taxable, and the price that actually shows at the register is frequently a complete surprise. In order to get an idea of the cost of your purchases, shoppers bring calculators to the grocery store in order to stay within their budget. Others remove items during checkout after the price is determined.

Between long checkout lines, and distraught shoppers, the shopping experience has become less enjoyable than it could be. This proposed system tries to address these problems and perform as an assistant to the shopper enhancing the experience and reducing the checkout time.

SUMMARY OF THE INVENTION

When a shopper enters a store or a mall that uses this technology, he is handed a Bluetooth (Reg. trademark) enabled wireless device with a barcode reader that can scan Universal Product Code (UPC) barcodes printed on items in the store. The shopper will then be required to login to the store's shopping system using the provided device or personal cell phone if the barcode reader could be connected to the personal device. This system is preferably configured to operate with a personal account that was previously setup to begin shopping.

Through the provided device or the personal cell phone shoppers are presented with several primary functions such as "Price Check", "Purchase Item" and "Check out" and several secondary functions such as "Show Cart Detail", "Show Stock Detail", "Remove Items" and logout. If "Check Out" is selected, shopping cart items are browsed and edited and verified and finally a receipt is printed which could be used with the register checkout counter's receipt for final verification. If "Price Check" is selected, the final price of the item is displayed which will include any discounts based on a sale price, volume purchase or personal contract with the vendor. If "Purchase Item" is selected, a cart is created if it does not already exist, items are added to the cart as it is scanned and running totals are calculated and presented.

Other secondary function proposed by this system are: removing items from the cart, showing the cart details, showing the inventory of the store for the scanned item and finally logout option to return the device back to the store.

Another proposed functionality of this system could be to combine a shopping list that is already stored on the user's personal wireless communication device with the cart items and display the items that are missing from the shopping cart, if the shopper's personal wireless communications device is used. This capability could further enhanced, if user could create a shopping list on the vendor's borrowed communication device or if the shopper could create a shopping list through the vendor's web site remotely before the shopping begins.

DETAILED DESCRIPTION OF THE PREFERRED EMBODIMENTS

One of the embodiments is a system and method of shopping using wireless communication which could be used in a shopping center or mall (as an example). This method is comprised of the following steps (as an example): a shopper is using a wireless device to communicate with a network.

The shopper logs in to a store shopping system network, using a cellular or mobile phone. The shopper scans the bar code or universal symbol printed on a first object using the wireless device, where the first bar code or universal symbol is indicating price, tax, and information about the first object. The shopper adds the first object to the first shopping cart. The shopper removes a second object from the first shopping cart, and she/he calculates a total value of the first shopping cart. She/he is establishing a first shopping list as an alternative to the first shopping cart, and is calculating a total value of the shopping list (while storing the first shopping cart and the first shopping list on the wireless device and the cellular or mobile phone).

The shopper scans a second bar code or universal symbol printed on a piece of paper or substrate, using the wireless device from a remote location with respect to the physical location of the shopping center or mall.

The second bar code or universal symbol indicates price, tax, and information about a third object. The shopper adds the third object to a virtual shopping cart. The shopper removes a fourth object from the virtual shopping cart, calculating a total value of the virtual shopping cart, establishing a virtual shopping list as an alternative to the virtual shopping cart, calculating a total value of the virtual shopping list and stores the virtual shopping cart and the virtual shopping list on the wireless device and the cellular or mobile phone.

Some of the capabilities of this system are, but not limited to: combining the data from the virtual shopping cart and the virtual shopping list on the wireless device and cellular or mobile phone with the data from the first shopping cart and the first shopping list on the wireless device and the cellular or mobile phone. It is also capable of checking the available inventory at the store shopping system, checking the available sales and coupons at the store shopping system, displaying all the objects selected by the shopper, comparing all the objects selected by the shopper with each other and with a database. It is also capable of receiving a discount based on a volume of purchase, obtaining a contract between the store shopping system and the shopper, receiving a discount based on predetermined prices given in the contract between the store shopping system and the shopper, where the contract further comprises a pre-approved list of items and pre-approved credit. (410, 412, 414) Also checking out objects from the store shopping system, returning a fifth object to the store shopping system and receiving a receipt from the store's shopping system.

Figure 1:
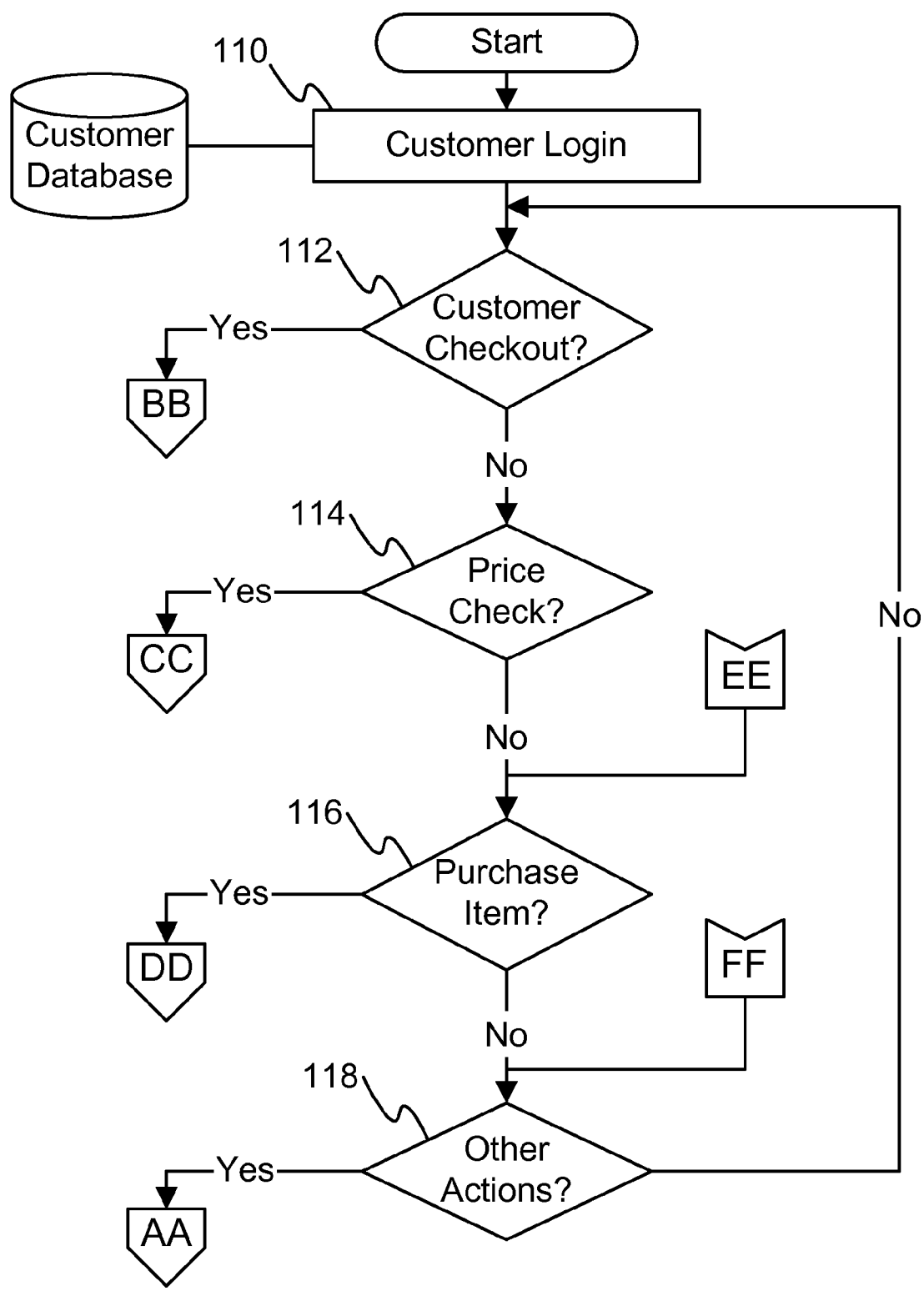
FIG. 1 is the flow diagram for the major functionality of the system.

Another embodiment of this system is depicted in FIGS. 1-5 and is as follows: A shopper walks into a store and mall and uses a wireless device such as a cell phone or a vendor provided equipment and logs into the providers network using and existing personal account (FIG. 1, step 110). The main functionality presented to the customer could be the following but not limited to: "Customer Checkout", "Price Check", "Purchase Item" and "Other Actions". "Other actions" could be the group of the following options but not limited to: "Remove Item", "Show Cart Detail", "Show Stock Detail" and "Log Out".

Figure 3:
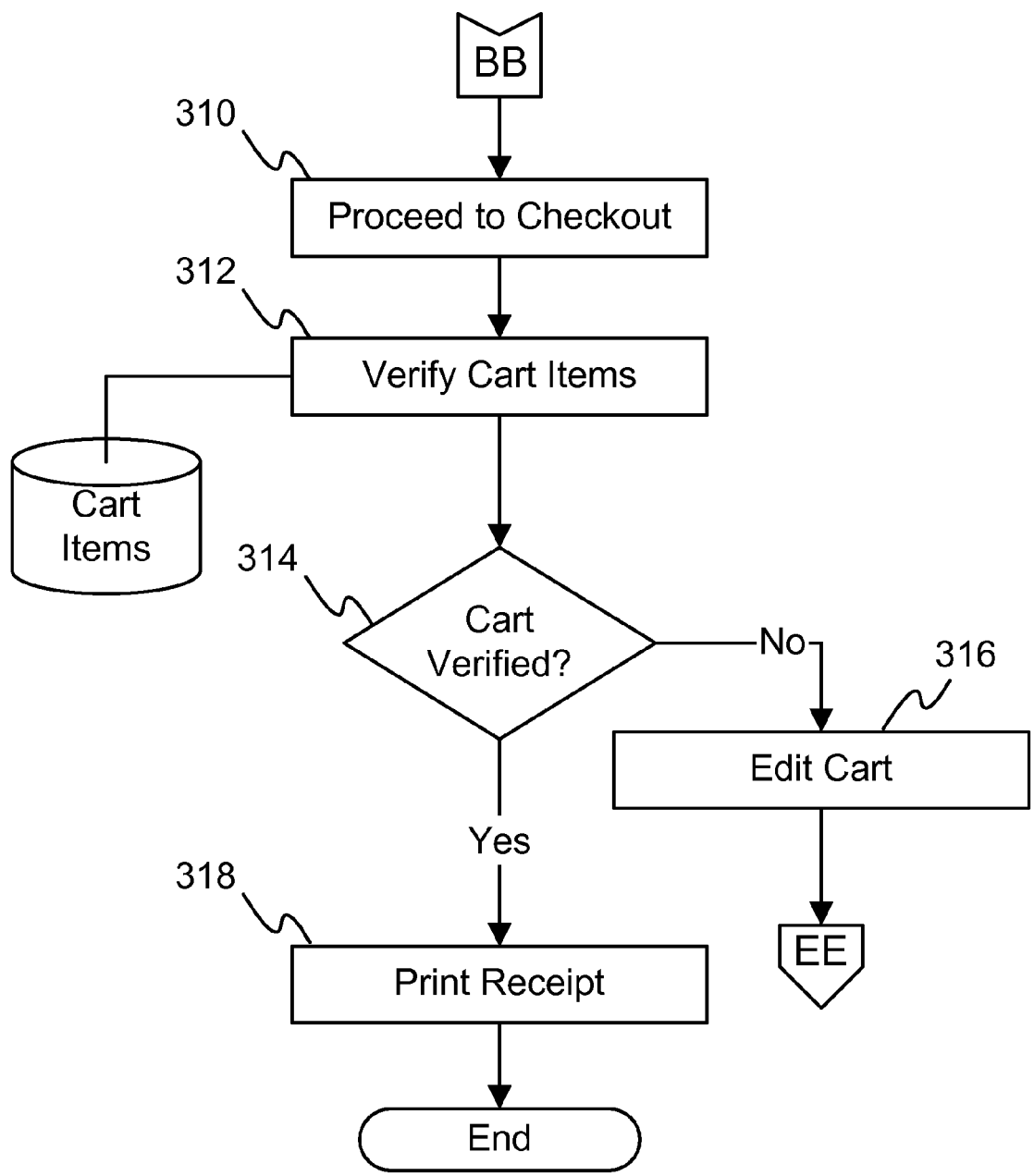
FIG. 3 is the detailed flow diagram for "Customer Checkout" function.
Figure 4:
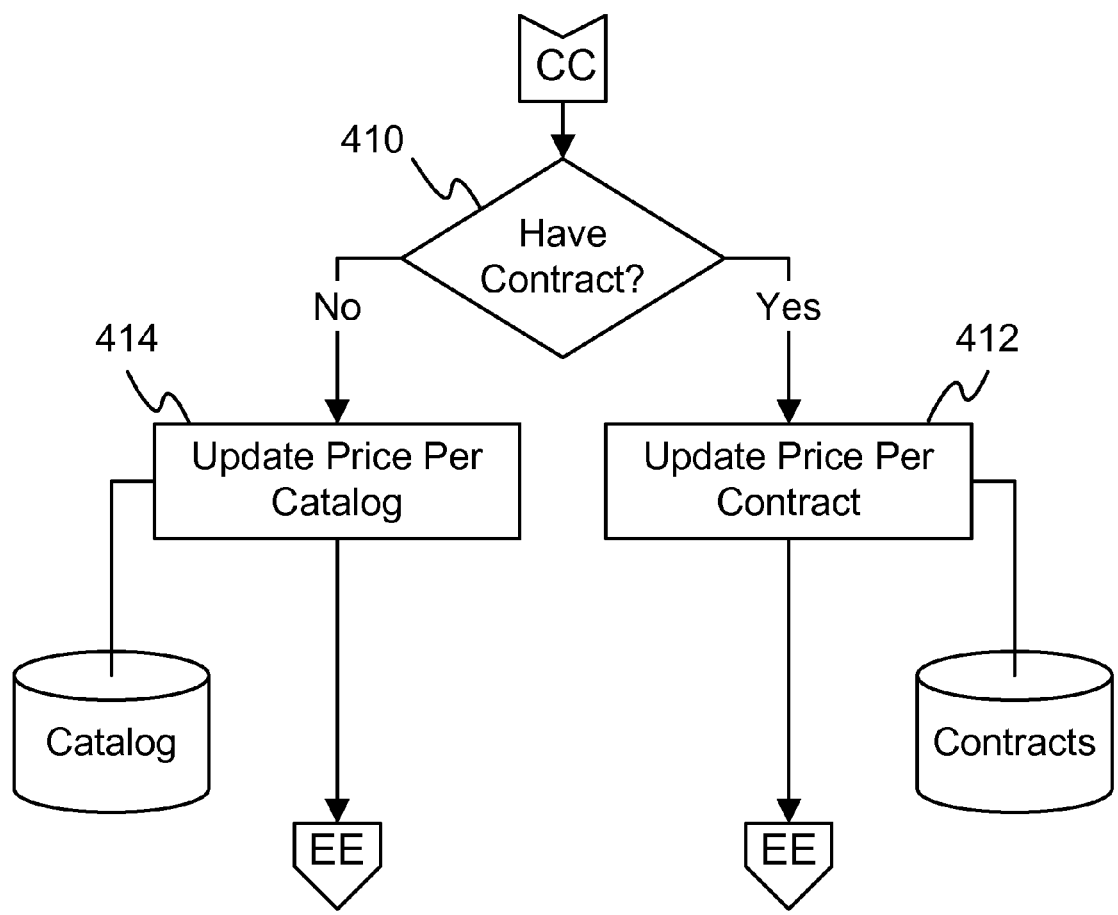
FIG. 4 is the detailed flow diagram for customer "Price Check" function.

If "Customer Checkout" option is selected (FIG. 1, step 112), customer is instructed to proceed to the checkout (FIG. 3, step 310), cart items are presented to the customer in step 312 of FIG. 3 for review and verification. If cart contents is verified (FIG. 3, step 314), a receipt is printed, customer is logged out of the network and process ends. This would be the verification of the purchase and account and the quick check at the checkout counter is to flag items that are not in the cart or not in the list which could be added or removed quickly. If the cart contents is not verified (FIG. 3 step 314), cart contents can be edited (FIG. 3, step 316) and items added and removed. At this stage customer is presented with "Purchase Item" option, which will be described in the following paragraphs (with a receipt option (318)).

If "Price Check" option is selected (FIG. 1, step 114), Contracts database, discounted items list, quantity purchase discount or any other special pricing schedules are consulted to provide the final discounted cost of the purchase of the item to the customer. If no special price was found and no special contract for this customer was located, the normal store catalog is consulted and the price is displayed. At this stage, the "Purchase Item" option is displayed to the customer and is discussed in the next paragraph.

Figure 5:
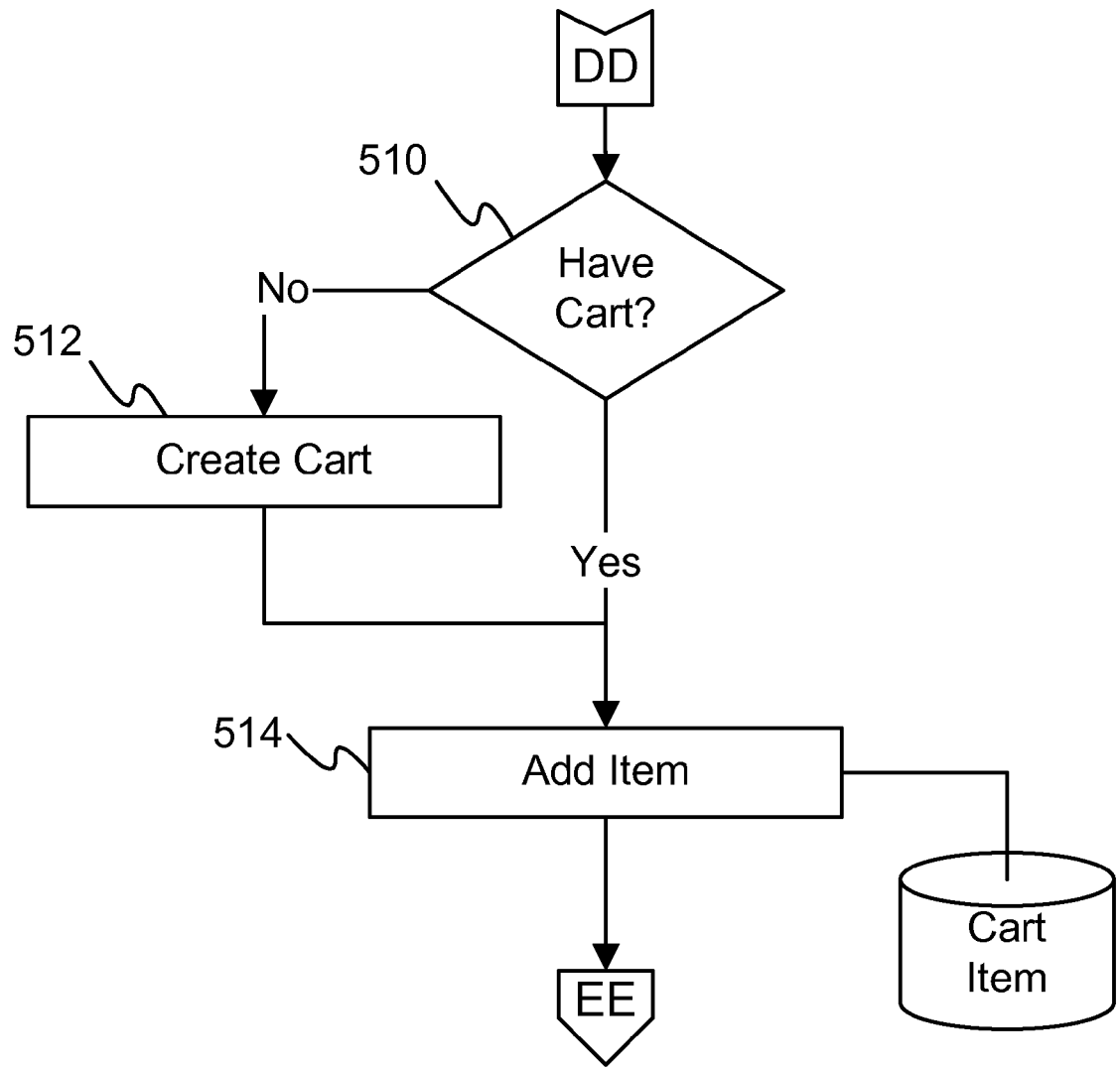
FIG. 5 is the detailed flow diagram for customer "Purchase Item" function.

If "Purchase Item" option is selected (FIG. 1, step 116), the system verifies that a cart for this purchase exists (FIG. 5, step 510). If a shopping cart does not exit, it is created (512) and then the item is added to this cart (FIG. 5, step 514). If the shopping cart already exists, this item is simply added to the existing shopping cart. At this stage, customer is presented with the "Purchase Item" option again for scanning of the next barcode. This loop continues until the customer is completed with scanning and selects no for the last "Purchase Item" option which will then presented with "Other Actions" option which is discussed in the next paragraph.

"Other Actions" option is presented in FIG. 1 step 118, once the customer selects "No" for the "Purchase Item" option. At this stage, if the customer selects "No" again to this option, the main option menu is presented with "Customer Checkout" option at the top. If customer selects "Yes" for "Other Actions" option, the second set of options is presented which could be the following and not limited to: "Remove Item", "Show Cart Detail", "Show Stock Detail" and "Log Out" (FIG. 2).

If "Remove Item" option is selected (FIG. 2, step 210), the current cart item is removed from the list (FIG. 2, Step 212), cart item list is updated and customer is presented with "Other Actions" option again.

If "Show Cart Detail" option is selected (FIG. 2, step 214), shopping cart items detail is presented (FIG. 2, step 216) and customer can scroll through the list of the shopping cart and view the details and prices for each item until the end of the list is reached and customer is again presented with "Other Actions" option. Exiting this mode could be done simply by reaching the end of the list or hitting a special function key such as ESC, left or right arrows or any other special key. If the customer has already created a shopping list remotely through the vendor's web site or on its personal communication device, this verification of the cart which is the consolidated list could show the items that are missing and not in the shopping cart and must be shopped.

Figure 2:
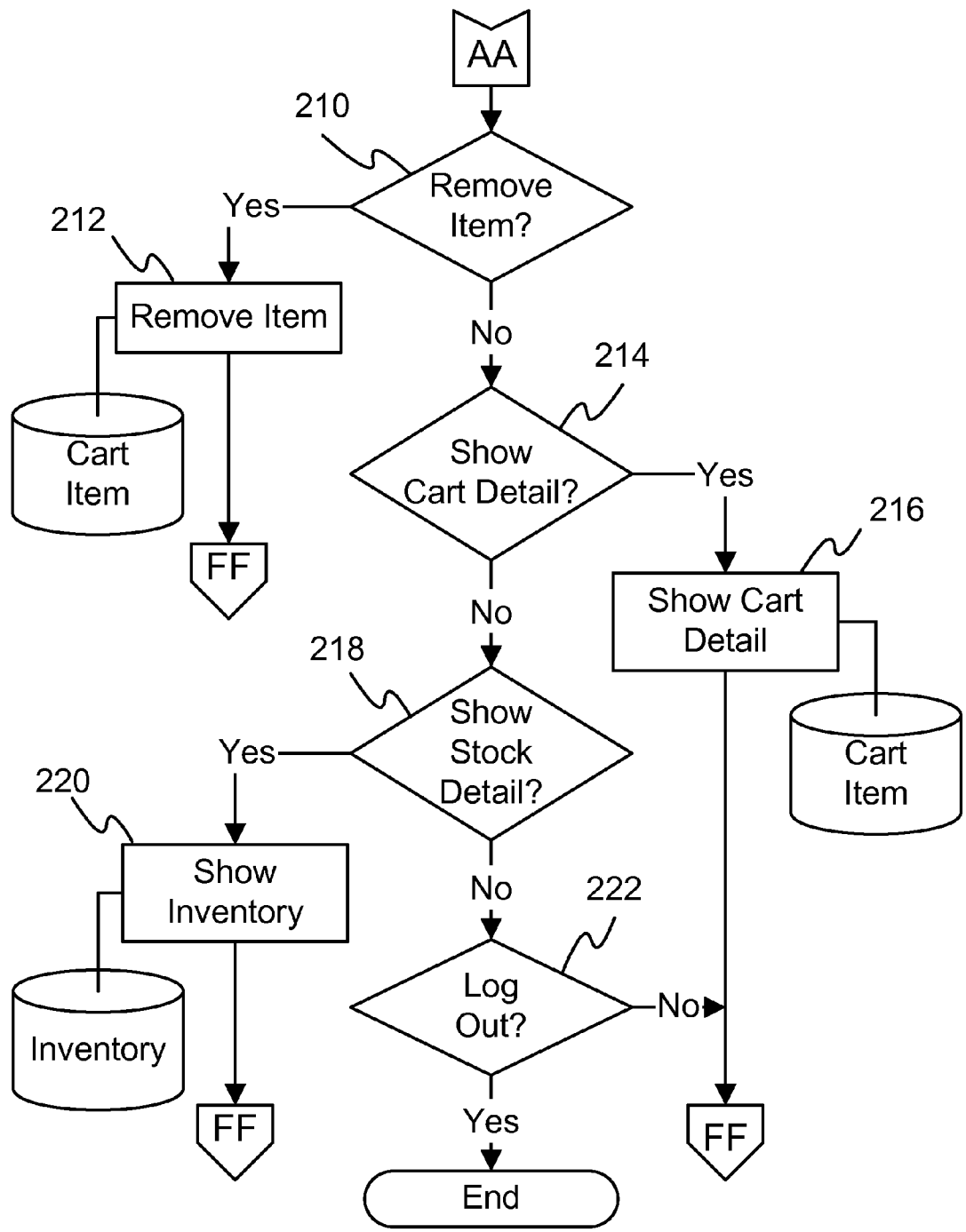
FIG. 2 is the flow diagram for the major functionality of the system continued from FIG. 1.

If "Show Stock detail" option is selected (FIG. 2, step 218, store's inventory list is presented and customer can view the detail of items in the inventory. Once the end of the list is reached, customer is again presented with "Other Actions" options. Exiting this mode could be done simply by reaching the end of the list or hitting a special function key such as ESC, left or right arrows or any other special key. (220)

If the "Log Out" option is presented (FIG. 2, step 222), customer has an option of simply accepting (selecting "Yes"), which terminates the connection and logs the customer out and wireless device is ready for the next use. If "No" is selected, "Other Action" option is again presented and customer can continue.

A system, apparatus, or device comprising one of the following items is an example of the invention: wireless device, RFID tag, store front, shopping cart, email server, server, client device, PDA, mobile device, cell phone, storage to store the messages or data, router, switches, network, communication media, cables, fiber optics, physical layer, buffer, nodes, packet switches, computer monitor, any display device, bank, or credit card, applying the method mentioned above, for purpose of shopping and wireless communication.

Any variations of the above teaching are also intended to be covered by this patent application.

The invention claimed is:

1. A method of shopping using wireless communication, used in a shopping center or mall, said method comprising the steps of:

a shopper using a wireless device to communicate with a network;

said shopper logging in to a store shopping system, using a cellular or mobile phone;

said shopper scanning a first bar code or universal symbol, printed on a first object, using said wireless device;

wherein said first bar code or universal symbol indicating price, tax, and information about said first object;

said shopper adding said first object to a first shopping cart;

said shopper removing a second object from said first shopping cart;

calculating a total value of said first shopping cart;

said shopper remotely creating a first shopping list through a vendor's web site as an alternative to said first shopping cart;

calculating a total value of said first shopping list;

storing said first shopping cart and said first shopping list on said wireless device and said cellular or mobile phone;

said shopper scanning a second bar code or universal symbol printed on a piece of paper or substrate, using said wireless device, from a remote location with respect to the physical location of said shopping center or mall;

wherein said second bar code or universal symbol indicating price, tax, and information about a third object;

said shopper adding said third object to a virtual shopping cart;

said shopper removing a fourth object from said virtual shopping cart;

calculating a total value of said virtual shopping cart;

establishing a virtual shopping list as an alternative to said virtual shopping cart;

calculating a total value of said virtual shopping list;

storing said virtual shopping cart and said virtual shopping list on said wireless device and said cellular or mobile phone;

combining the data from said virtual shopping cart and said virtual shopping list on said wireless device and said cellular or mobile phone with the data from said first shopping cart and said first shopping list on said wireless device and said cellular or mobile phone;

displaying a consolidated list of items from said virtual shopping cart and said virtual shopping list to show missing items not in the shopping cart that must be shopped;
checking the available inventory at said store shopping system;
checking the available sales and coupons at said store shopping system;
displaying all the objects selected by said shopper;
comparing said all the objects selected by said shopper with each other and with a database;
receiving a discount based on a volume of purchase;
obtaining a contract between said store shopping system and said shopper;
receiving a discount based on predetermined prices given in said contract between said store shopping system and said shopper;
wherein said contract further comprising a pre-approved list of items and pre-approved credit;
checking out objects from said store shopping system;
returning a fifth object to said store shopping system; and
receiving a receipt from said store shopping system.

\* \* \* \* \*